Sept. 2, 1952        H. J. SMITH        2,608,920
CAMERA
Filed July 12, 1950        4 Sheets-Sheet 1
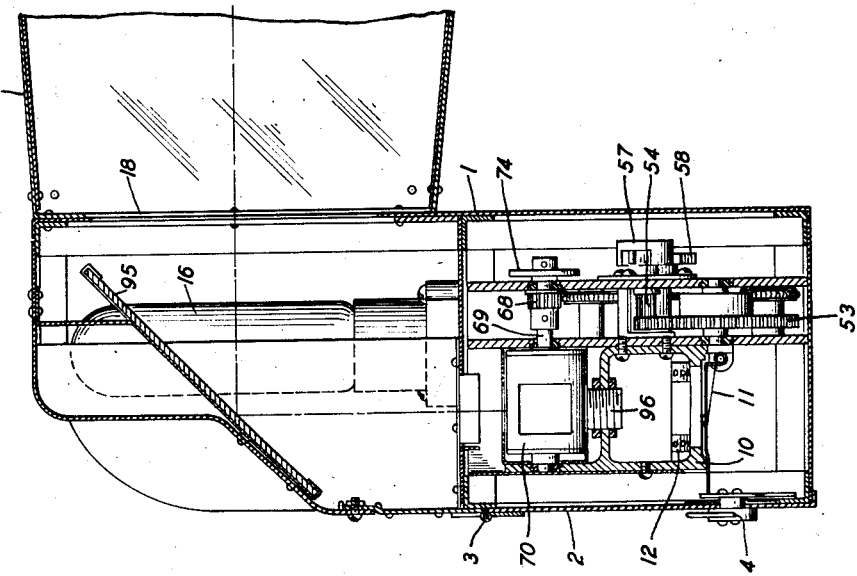
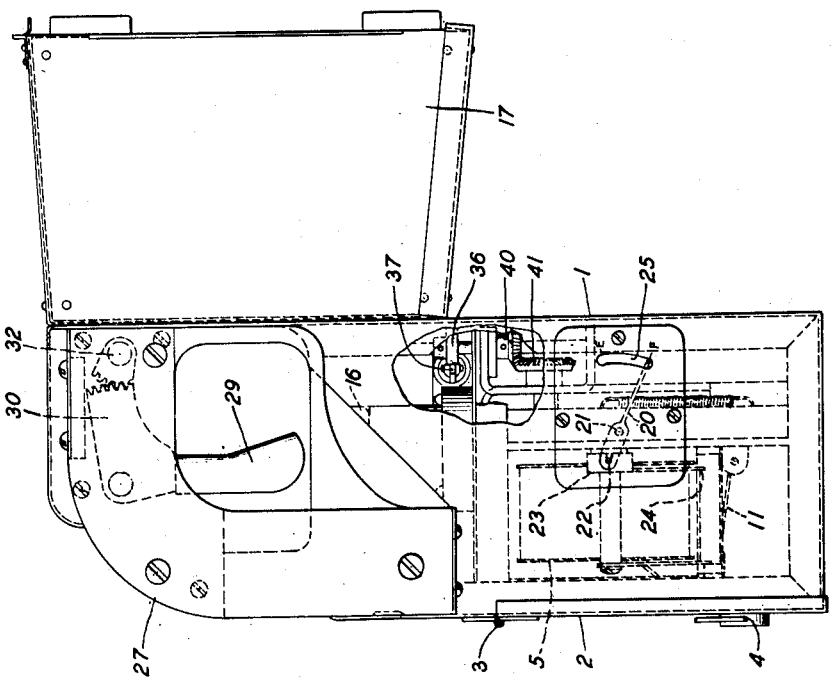
INVENTOR
H.J. SMITH
BY
J. F. McEneany
ATTORNEY Sept. 2, 1952    H. J. SMITH    2,608,920
CAMERA
Filed July 12, 1950    4 Sheets-Sheet 2
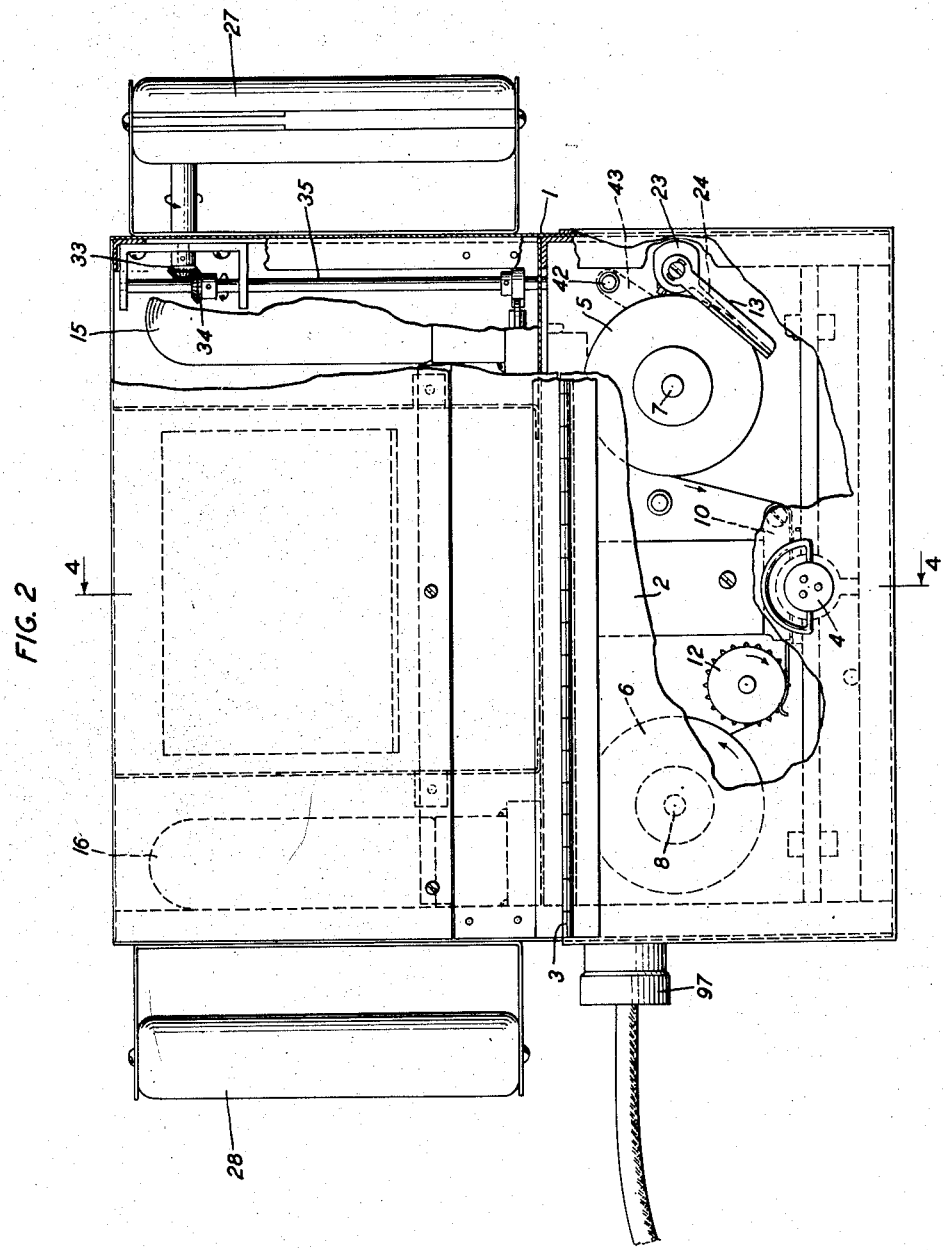
INVENTOR
H. J. SMITH
BY
J. F. McEneany
ATTORNEY Sept. 2, 1952  H. J. SMITH  2,608,920
CAMERA
Filed July 12, 1950  4 Sheets-Sheet 3

INVENTOR
H. J. SMITH
BY
*J. F. McEneany*
ATTORNEY

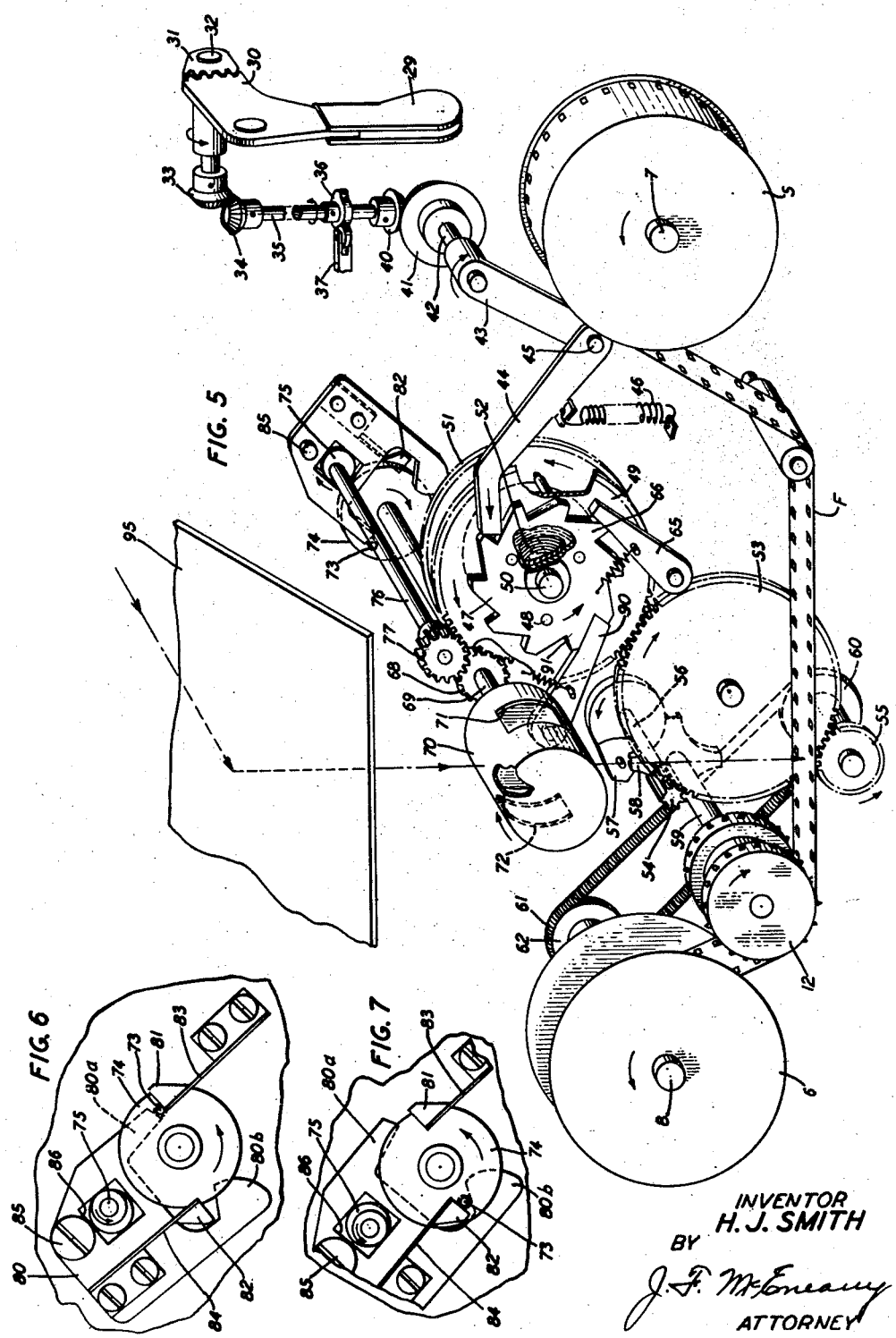

Patented Sept. 2, 1952

2,608,920

UNITED STATES PATENT OFFICE 2,608,920

CAMERA

Howard J. Smith, Yonkers, N. Y., assignor to Bell Telephone Laboratories, Incorporated, New York, N. Y., a corporation of New York Application July 12, 1950, Serial No. 173,357

7 Claims. (Cl. 95—31)

This invention relates to cameras and particularly to improvements in cameras employed in photographing groups of recording meters.

It is the object of this invention to provide a compact camera incorporating means whereby the successive operations incident to the recording of a single exposure on a film are effected by continuous movement of a single operating lever.

A feature of the invention resides in the provision of a partially wound spring motor which is wound an additional amount by the initial rotation of an element of the film moving mechanism to produce operation of the shutter mechanism a predetermined interval of time following completion of film movement.

A further feature of the invention resides in the provision of means associated with the film driving mechanism which, in the event of a partial movement and then return of the operating lever, operates to prevent return to its initial position and reoperation of the film driving mechanism once a recording area of the film has been moved to position in front of the exposure aperture.

Cameras developed for photographing groups of recording meters, such as message registers mounted on equipment frames in telephone exchanges, usually carry the light sources used to illuminate the field to be photographed. Also, a hood is provided which is attached to and extends from the camera. The free end of this hood is placed against the bank of registers and determines the area of the field and the distance between the field and the camera lens. Such cameras are usually of a size to require the use of both hands of an operator to accurately place the camera in position for recording each of the large number of pictures necessary to photograph a complete set of message registers in a telephone exchange. It is highly desirable, therefore, in the interest of facility and speed of camera operation to eliminate the necessity for stopping between exposures to effect such camera operations as moving the film to a succeeding exposure area and winding the shutter operating spring.

In accordance with this invention, one of two carrying handles disposed on the exterior of the camera housing is provided with a manually operable lever, the operation of which through a single continuous movement produces sequential operation of the light sources, the film moving mechanism and the shutter. The lever operates in sequence a cam for closing a switch in the circuit to the light source, a train of gears to a Geneva gear mechanism producing movement of the film to a succeeding exposure area and an escapement mechanism associated with a shutter shaft. Movement of one of a train of gears to the film moving mechanism operates to substantially completely wind a partially wound coil spring. This spring tends to rotate a gear which, in turn, produces rotation of a shutter shaft at the moment the escapement mechanism releases this shaft for rotation. The spring is initially wound to approximately 80 per cent of its fully wound position to provide an initial motive power. The initial movement of an element of the film driving mechanism additionally winds the spring an amount equal to the amount the spring will be unwound in producing a single rotation of the shutter. Means are provided to prevent return of the film moving gear train to its initial or starting position once the operating lever has been operated through an angle sufficient to complete film movement even though this lever is returned to its initial or starting position. A succeeding movement of the lever picks up operation of the camera mechanism in its prescribed sequence only at the point such operation ceased in the first movement to thereby complete the sequence of operations without repetition of the film moving step.

The invention will be more clearly understood from the following specification when read in connection with the drawings in which:

Fig. 1 is a side elevation of the camera in accordance with this invention;

Fig. 2 is a rear elevation of the camera;

Fig. 4 is a section taken along line 4—4 of Fig. 2;

Fig. 5 is a schematic of the film and shutter driving elements of the camera; and Figs. 6 and 7 are two views of the escapement mechanism employed to release the shutter of the camera for operating a predetermined time after commencement of film movement.

Figure 3:
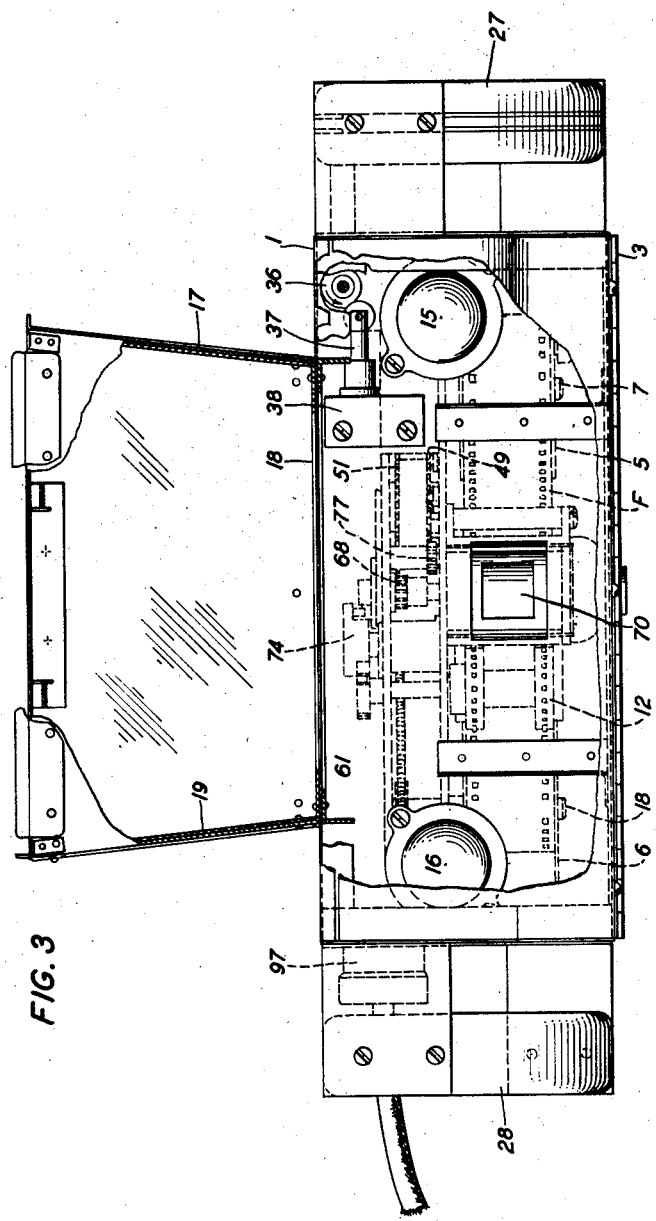
Fig. 3 is a top elevation partly broken away to show the interior mechanism.

Referring to Figs. 1, 2 and 3, the camera mechanism is enclosed in a housing 1. The lower portion of this housing contains the film reels and the film and shutter driving mechanisms and is provided with a door 2, hinged at 3. A rotatable locking device 4 is provided on door 2. This door permits access to the interior of the lower compartment of housing 1 for placing the feed reel 5 and the take-up reel 6 on shafts 7 and 8, respectively. The marginally perforated film F, between the reels, passes over and in contact with an apertured film gate 10 and is held in contact with this gate by a pivoted, spring-urged pressure shoe 11. Between the gate and take-up reel 6, the film F is threaded in driving connection with a film driving sprocket 12. A spring-urged, pivoted arm 13 is provided to maintain reel 5 on its shaft. This arm may be moved about its pivot to permit insertion and removal of the reel 5.

In the upper portion of the housing 1, two projection lamps 15 and 16 are provided. These lamps illuminate the field to be photographed, the boundaries of which are defined by the free end of a hood 17 extending from but attached to housing 1 in line with an exposure aperture 18 therein. The lamps 15 and 16 are so located in the housing that each one illuminates one-half of the field to be photographed. The sides of hood 17 are lined with light-reflecting material 19 which reflects light rays to the field to be photographed in a direction to soften shadows produced by the direct rays from the light source.

Referring to Fig. 1, a film footage indicator is provided in the form of a needle 20 pivoted at 21 and provided at its base end with a pin 22 which fits into a groove in an element 23. The element 23 is spring-urged to rotate in a direction to force a feeler 24 against the periphery of the film roll on reel 5. The free end of needle 20 moves across an aperture 25 to indicate the approximate footage of film remaining on the feed reel.

A pair of handles 27 and 28 are secured to opposite sides of the housing by U-shaped brackets as shown clearly in Fig. 2. A bell crank operating lever 29 is pivotally mounted in handle 27 and is provided with a gear sector 30. A gear sector 31, in mesh with sector 30, is mounted on a shaft 32 which extends through the interior of housing 1. Shaft 32 is provided with a level gear 33 which meshes with a gear 34 secured to shaft 35. A cam 36 secured to shaft 35 actuates an operating arm 37, associated with a microswitch 38 to close an electrical circuit to the projection lamps 15 and 16.

A bevel gear 40 attached to shaft 35 meshes with a bevel gear 41 mounted on shaft 42.

Referring particularly to Fig. 5, an arm 43 has one end attached to shaft 42. Another arm 44 has one end thereof pivoted on arm 43, at 45, so that rotation of arm 43 will produce substantially linear movement of the free end of arm 44 in the direction indicated by the arrow. Movement of arm 44 is in the direction to produce counter-clockwise rotation of a ratchet 47.

Ratchet 47 is secured by means of rivets 48 to a gear 49. Both ratchet 47 and gear 49 are mounted on a shaft 50. Another gear 51, spaced from gear 49, is rotatably mounted on shaft 50. Between these two gears there is disposed a coil spring 52 which surrounds shaft 50. The inner end of spring 52 is anchored to gear 49 and the outer end thereof is anchored to gear 51. Spring 52 is partially wound during the non-operating period of the camera.

A gear 53, in mesh with gear 49, produces rotation of two further gears 54 and 55. Gear 54 is secured to one end of shaft 56, the other end of which has the driving element 57 of a Geneva gear unit secured thereto. The star wheel element 58 of the Geneva gear unit is secured to a shaft 59 on which is mounted the film driving sprocket 12.

Gear 55 produces rotation of a pulley 60 which is coupled by means of coiled spring belt 61 to pulley 62 on the shaft 8 of the take-up reel 6.

As will be readily understood from the above description, initial movement of lever 29 will operate cam 36 and arm 37 to close contacts of switch 38 in the circuit to lamps 15 and 16. At the same time, movement of lever 29 will produce movement of arm 44 in a direction to rotate ratchet 47 and gear 49 which, in turn, will produce movement of sprocket 12 through gears 53, 54 and the Geneva gear mechanisms 57, 58 to advance an unexposed strip of film F in front of the film gate 10. Coincident with this movement the reel 6 is operated through gear 55, pulley 60, belt 61 and pulley 62 to take up the film fed thereto by sprocket 12. The gear ratios are such that the film will be advanced the distance covered by five sprocket holes.

At the completion of this part of the cycle, a spring-tensioned pivoted arm 65 will be cleared by tooth 66 of ratchet 47 and will fall in behind the tooth to lock the ratchet 47 and gear 49 against return movement. At this point, therefore, the release of pressure on lever 29 returning it to its original position will have no effect on the film movement part of the cycle; that is, no film will be wasted by non-exposure when the lever is again operated, as the unexposed film area previously placed at the exposure aperture or gate is held at this point and the cycle of operation is resumed at the point of shutter operation, which will now be explained.

While the gear 49 is rotated initially to produce movement of the film F, the spring 52 is being wound. The motive power produced in the spring tending to rotate gear 51 is stored therein by reason of the fact that gear 51 is locked against rotation during this portion of the operating cycle as is explained hereinafter.

Gear 51 is in mesh with a gear 68 mounted on shaft 69 which carries a tubular shutter 70 provided with diametrically opposed apertures 71 and 72. Shaft 69 and, therefore, the driving gear 51 cannot rotate during this period by reason of the fact that the pin 73 on element 74 is held securely between the stops of an escapement mechanism.

Operation of the escapement mechanism to release the shutter shaft 69 is under control of cam 75 mounted on shaft 76 which carries a gear 77 in mesh with gear 49.

Referring particularly to Figs. 6 and 7, which show the underside of the escapement mechanism in its two positions of locking the shutter shaft, it will be seen in Fig. 6 that pin 73 is held between element 81 and stop 80a of yoke member 80. Element 81 and, similarly element 82 are each mounted on the free end of a flat flexible element 83 and 84, respectively.

Yoke member 80 is pivoted at 85 and is provided with a rectangular opening 86 against the surfaces of which the cam 75 may operate to produce movement of yoke 80 about it pivot.

Rotation of cam 75 in the direction indicated in Fig. 6 will free pin 73, thus permitting rotation of shutter shaft 69 under the action of spring 52, gear 51 and gear 68. The pin 73 and, therefore, shutter 70 is rotated through 180 degrees to allow a single exposure on the film. Pin 73 in its rotation hits flexible support 84 and then engages and is held from further rotation by the left stop 80b of yoke 80. The element 82 immediately falls in behind pin 73 to prevent chattering or backlash in the shutter shaft.

Referring back to Fig. 5, just prior to the completion of shutter operation a spring-tensioned, pivoted arm 90 falls in behind tooth 91 to prevent any reverse rotation caused by the tension in spring 52.

Following the completion of the cycle of operations, the release of pressure on lever 29 allows spring 46 to move arm 44 and the connected gears and shafts including lever 29, to their initial positions in readiness for a repeat operation to record a picture on a succeeding area of film.

The light reflected from the field to be photographed is deflected by a mirror 95 toward the shutter 70 and a lens mounted in a lens holder 96 (Fig. 4) disposed in front of the film gate 10.

The circuit including lamps 15 and 16 and switch 38 is terminated in a jack in the housing 1. Connection to a suitable source may be made by means of a plug 97, as shown in Figs. 2 and 3.

What is claimed is:

1. The combination in a camera having a film driving sprocket and an exposure shutter, of a driving gear, a driving connection between said gear and said sprocket, an escapement mechanism having one element thereof normally engaging said shutter to lock it against rotation and an engagement releasing element driven by said driving gear to release said first-mentioned element a predetermined time after the beginning of operation of said driving gear, a partially wound spring connecting said gear and said shutter, said spring being further wound by the rotation of said gear, and a driving means producing rotation of said gear to effect simultaneously the movement of said film driving sprocket and the winding of said spring and subsequent operation of said escapement mechanism to release said shutter for operation under the action of said spring.

2. A camera in accordance with claim 1 in which means are provided to prevent reverse operation of said driving gear following forward movement thereof sufficient to complete movement of said film driving sprocket.

3. The combination in a camera having a film driving sprocket and an exposure shutter, of a rotatable shaft on which said shutter is mounted, a gear attached to said shaft, a first driving gear, a driving connection between said first driving gear and said sprocket, a second driving gear in driving engagement with the gear on said rotatable shaft, a partially wound spring connecting said first and said second driving gears, releasable means normally locking said rotatable shutter shaft and said second driving gear against rotation, means producing rotation of said first driving gear to simultaneously drive said sprocket and to further wind said spring, and means operated by said first driving gear to release said shaft locking means upon completion of movement of said film driving sprocket.

4. A camera in accordance with claim 3 in which said releasable locking means reengages and locks said shutter shaft following a predetermined rotation thereof.

5. A camera in accordance with claim 3 in which means are provided to lock said first driving gear against reverse rotation following completion of movement of said film driving sprocket.

6. The combination in a camera having a film driving sprocket and an exposure shutter, of a releasable locking means preventing operation of said shutter, a driving gear, a positive driving connection between said gear and said sprocket, a driving connection between said gear and said shutter comprising a partially wound spring which is further wound by the initial operation of said driving gear, and means driven by said driving gear for releasing said locking means at a predetermined time following the beginning of operation of said driving gear.

7. The combination in a camera having a film driving sprocket and an exposure shutter, of a driving gear, a driving connection between said driving gear and said sprocket, a partially wound spring motor connecting said driving gear and said shutter, an escapement mechanism having an element thereof in locking engagement with said shutter to prevent operation thereof and a second element thereof driven by said driving gear to disengage said first-mentioned element subsequent to the beginning of operation of said driving gear, means producing rotation of said driving gear to effect simultaneously the movement of said sprocket and the winding of said spring motor and subsequent disengagement of the first-mentioned element of said escapement mechanism, said rotation producing means for said driving gear comprising a ratchet secured to one face of said driving gear and a driven pawl engaging said ratchet, and a second pivoted, spring-urged pawl adapted to engage said ratchet to prevent reversal of said driving gear after completion of operation of said sprocket but prior to the disengagement of the first-mentioned element of said escapement mechanism.

HOWARD J. SMITH.

REFERENCES CITED

The following references are of record in the file of this patent:

FOREIGN PATENTS

| Number | Country | Date |
|--------|---------|------|
| 181,576 | Switzerland | Apr. 16, 1936 |
| 246,011 | Switzerland | Aug. 16, 1947 |